Figure 1:
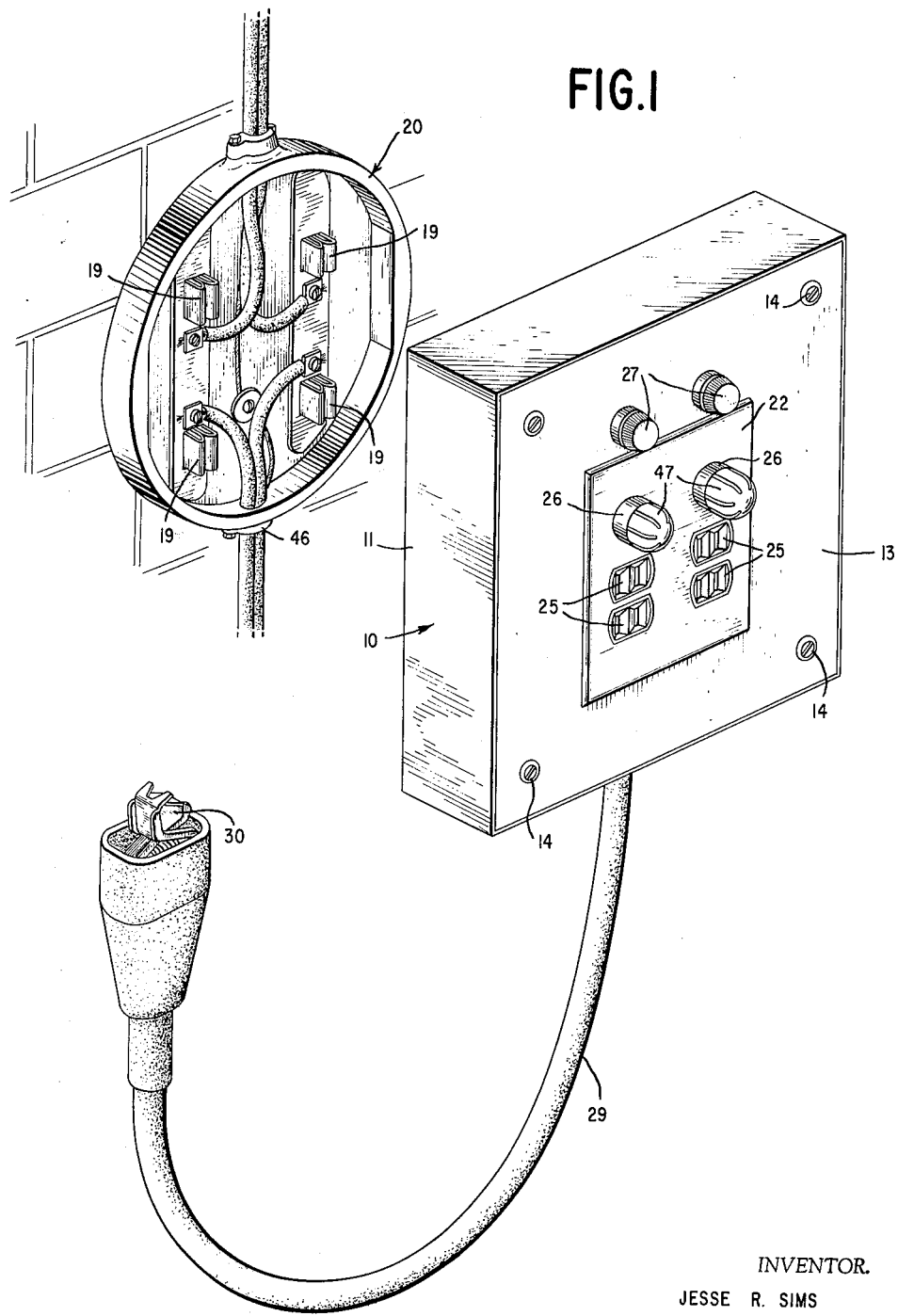

Aug. 24, 1965  J. R. SIMS  3,202,977
EMERGENCY ELECTRICAL POWER OUTLET UNIT
Filed May 9, 1962

3 Sheets-Sheet 1

INVENTOR.
JESSE R. SIMS
BY
*B. P. Fishburne, Jr.*
ATTORNEY

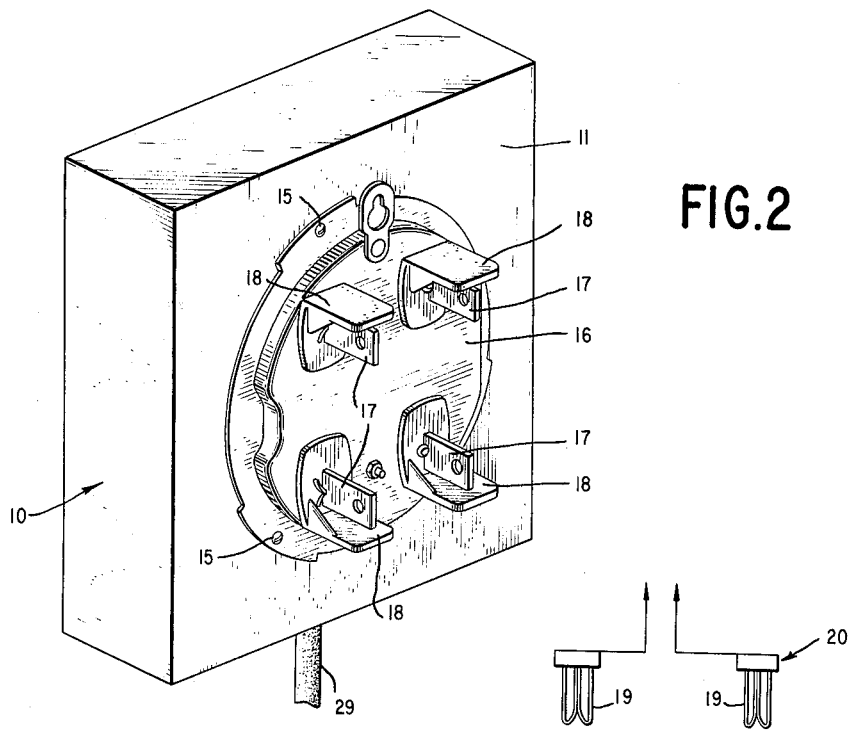
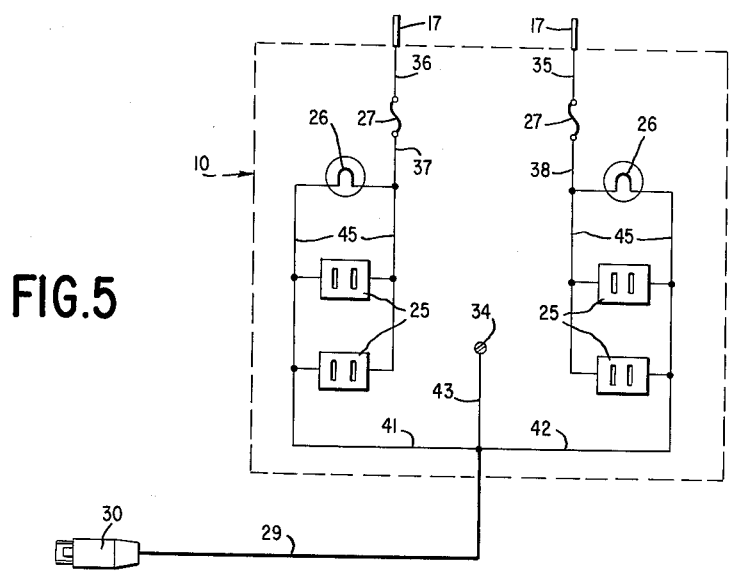

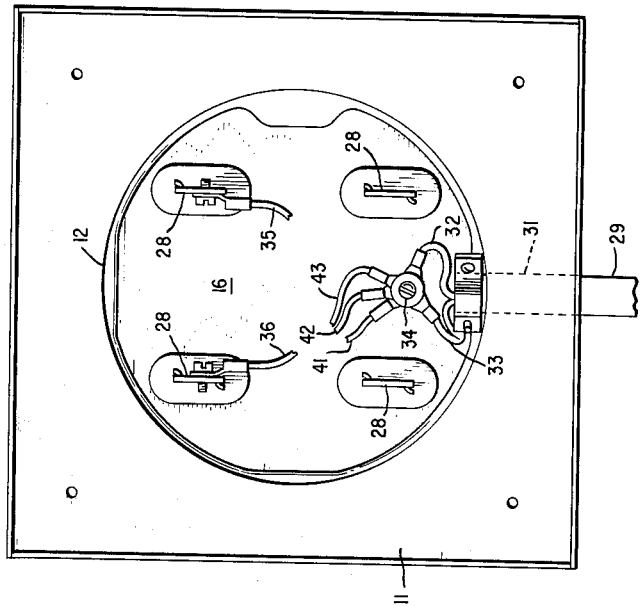
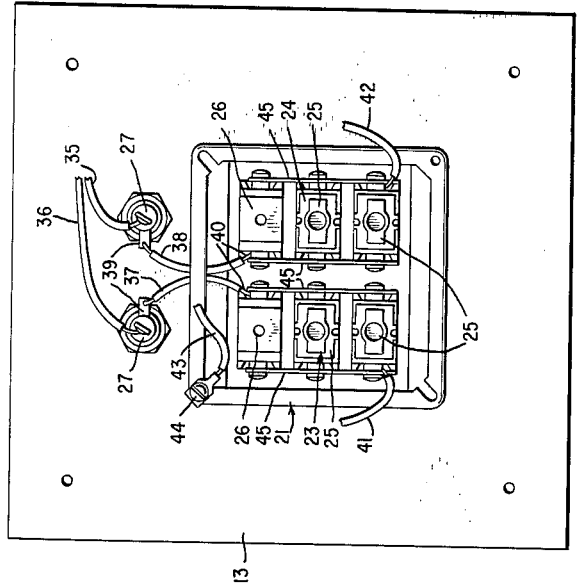

United States Patent Office 3,202,977
Patented Aug. 24, 1965

3,202,977
EMERGENCY ELECTRICAL POWER OUTLET
UNIT
Jesse R. Sims, 426 Manor Circle, Florence, S.C.
Filed May 9, 1962, Ser. No. 193,561
2 Claims. (Cl. 340—252)

This invention relates to an electrical power outlet unit for emergency use.

In the fighting of fires and in other disaster work following explosions and the like, the wiring of buildings is frequently burned or otherwise damaged and unsafe for use upon the arrival of fire fighting equipment or other disaster teams. Electrical equipment such as exhaust fans, floodlights and similar appliances are a necessity in modern day fire fighting and disaster work, and it frequently occurs that no safe and properly functioning electrical power outlets are available at the scene of the fire or disaster and firemen and other rescue workers are greatly handicapped in combating the fire or disaster and sometimes cannot employ the necessary electrical appliances on the scene.

Accordingly, the primary object of this invention is to provide a highly simplified, compact and lightweight portable emergency electrical power outlet unit which may be carried to the scene of the fire, explosion or like disaster and plugged in to the base of the conventional socket-type electric meter, commonly installed by power companies upon the outer walls of buildings, to thereby provide an immediately available outlet means for the required electrical appliances at the scene of the fire or disaster and without the necessity of utilizing interior electrical outlets within a building structure which may already have been seriously damaged and rendered unsafe.

A further object is to provide an emergency electrical outlet unit which may be installed or plugged into place by merely first removing the outside electric meter from its socket base and plugging the invention unit directly into this base and grounding the invention unit by means of a pigtail provided thereon for this purpose, all without the necessity for any special tools and without the need for "on the scene" electrical wiring or hook-ups.

Another object of the invention is to provide an emergency electrical power outlet unit which is sturdy and durable and which may be repeatedly used indefinitely by fire departments and the like and which is properly fused and includes signal light means to indicate to the user which circuits or outlets of the unit are energized upon plugging in of the unit, the unit embodying plural electrical outlets for operating plural electrical appliances necessary for fighting fires and various other disaster clean-up operations.

Another object is to provide a unit of the mentioned character which is very economical to build, reliable and efficient in operation, and which requires no special skill whatsoever to handle or use.

Other objects and advantages of the invention will be apparent during the course of the following detailed description.

In the accompanying drawings forming a part of this application and in which like numerals are employed to designate like parts throughout the same, FIGURE 1 is a front perspective view of an emergency electrical power outlet unit according to the invention shown adjacent to a standard socket-type meter base on the exterior wall of a building prior to plugging the unit into such base and grounding the unit on the base, FIGURE 2 is a rear perspective view of the invention unit, FIGURE 3 is a plan view of the rear face of the front or face panel of the unit, FIGURE 4 is a similar view of the unit with the face plate removed, and FIGURE 5 is an electrical wiring diagram showing the electrical components of the unit for coaction with the socket base of the outside meter.

In the drawings, wherein for the purpose of illustration is shown a preferred embodiment of the invention, the numeral 10 designates the invention unit in its entirety, and this unit comprises a rectangular block-like body portion 11, formed of wood or other suitable electrical insulating material and having a large preferably cylindrical opening 12 formed therethrough centrally. A rectangular face plate or panel 13 is detachably rigidly secured by screws 14 to the forward flat face of the body portion 11, in covering relation to the opening 12 and rendering the rectangular unit substantially closed as shown in the drawings.

To the back face of the block-like body portion 11 is detachably rigidly secured by screws 15 a metallic disc 16, similar to the base of a standard house-type electric meter and having mounted thereon in a conventional manner the usual contact prongs 17 protected by insulating spacers 18 as shown in FIGURE 2. During use of the invention unit, the prongs 17 frictionally engage within spring contacts 19 or sockets on the socket type meter base 20 shown attached to an exterior wall of a building, FIGURE 1, after the electric meter proper has been removed. That is to say, after arrival of the fire department or disaster team at the scene of the fire or the like, the outside electric meter is pulled off of the socket base 20 to expose the spring contacts 19. The disc 16 of the invention unit fits the base 20 and the prongs 17 and their insulating spacers 18 are arranged to fit the spring contacts 19 so that the invention unit shown in FIGURE 1 can be plugged bodily into the meter base 20 with no difficulty and without the need for tools or any on the scene wiring.

With reference to FIGURES 1 and 3, the front panel 13 has secured to the inner face thereof a metallic box or housing 21 and to the front face thereof an ornamental cover plate 22 formed of Bakelite or the like. Within the housing 21 is rigidly mounted a pair of three part electrical outlet units 23 and 24 of conventional construction, each including a pair of standard two-prong electrical outlets or sockets 25 and a signal light bulb receptacle 26, FIGURES 1 and 3. These elements 25 and 26 project through suitable openings in the cover plate 22 at the forward side of the device as indicated in FIGURE 1. The outlet units 23 and 24 are themselves conventional and need not therefore be described in detail herein. Fuses 27 are also mounted upon the front panel 13 above the outlet units 23 and 24 and above the cover plate 22 and housing 21, as shown. As will be further described, the invention unit when activated provides two 110-volt outlets for operating various appliances or four 110-volt outlets in the case of a three wire service into the meter base 20 on a particular building. As will be further described, the signal lights in the guarded receptacles 26 will indicate to the user whether the four outlets 25 are active, as in a three wire system, or whether a pair only of the outlets 25 is active and usable.

In FIGURE 4, the interior terminals 28 of prongs 17 are visible upon the inner side of the disc 16. A grounding pigtail 29 having a terminal clip 30 at its free end passes upwardly through an opening 31 in the bottom of the body portion 11 and leads into the opening or cavity 12 at the bottom side of such opening. The wires 32 and 33 of the pigtail cable 29 have their terminals electrically connected at 34, FIGURE 4, to the metallic disc 16. Additional wires 35 and 36, electrically connected with the uppermost prong terminals 28, FIGURE 4, lead to and are electrically connected with corresponding terminals of the fuses 27, FIGURE 3. Additional wires 37 and 38 lead from the other corresponding terminals 39 of fuses 27 and are electrically connected at 40, FIGURE 3, with the signal light bulb receptacles 26.

Wires 41 and 42 are electrically connected with the plural outlet units 23 and 24, each having a pair of the sockets 25, and these wires lead to and are electrically connected to the terminal 34 on the metallic disc 16, FIGURE 4. A grounding wire 43 is electrically connected at 44 to the metallic housing 21, and leads to the terminal 34 and is also electrically connected therewith as shown in FIGURE 4 and in the wiring diagram, FIGURE 5. The outlet units 23 and 24 are each provided on opposite sides thereof with bridging conductor strips 45, FIGURE 3, common to the light bulb sockets 26 and sockets or outlets 25, and this construction is conventional. The strips 45 are also shown on the wiring diagram, FIGURE 5, electrically connected with the wires 41 and 42 and the wires 37 and 38 and with the terminals of sockets 25 and signal light bulbs 26.

During use, upon arrival at the scene of a fire or like disaster, the firemen bodily remove the outside electric meter of the plug-in type from the building, leaving the socket base 20 exposed and ready for use as depicted in FIGURE 1. The invention unit shown in FIGURE 1 is merely plugged into the base 20 and the prongs 17 are received by the spring contacts 19. The insulating spacers 18 will bottom upon the back wall of the base 20 and the circular disc 16 will be received within the annular wall of the base 20.

The circuitry of the invention unit is not fully energized by the mere plugging in of the device, and this is an added feature of safety. The invention unit is not fully activated until the pigtail clip 30 is attached to the metallic boss 46 on the bottom of the base 20 or to some other convenient point of attachment on the metallic base 20 for grounding the invention unit.

When the pigtail 29 is thus grounded upon the meter base 20, the left hand red signal light bulb 26 will light up, FIGURE 1, indicating that the two appliance outlets 25 immediately therebelow on the left hand sire are active to supply current to various 110-volt appliances, such as lights, exhaust fans, and the like, to be used for fighting the fire.

In the case of a three wire service upon the building, when the invention unit is plugged in and grounded through the pigtail 29, both of the signal light bulbs 26 will light up indicating that the four outlets 25 for 110-volt appliances are active and may be utilized if needed. The fuses 27 protect the circuits of the outlets 25 at all times, as shown in FIGURE 5.

The fire fighters or disaster workers utilize the invention unit to operate their appliances until the fire is extinguished and the unit effectively bypasses the interior house or building circuits and allows the necessary appliances to be plugged in safely outside of the building. Upon completion of the work, the entire invention unit is unplugged from the meter base 20 and taken away from the scene with the other equipment and the device used in this manner may be reused almost indefinitely as a permanent durable piece of fire fighting equipment. The construction of the unit is rugged and durable and maintenance is limited to occasionally replacing the quick disconnect fuses 27 and the signal light bulbs 26 which are arranged beneath slotted removable metallic guards 47. The unit is made up of conventional readily available electrical components and is very economical to construct. The exterior surfaces of the body portion 11 and the panel 13 may be painted or covered with sheets of formica or the like to render the device further durable and neat and workmanlike in appearance.

It is to be understood that the form of the invention herewith shown and described may be taken as a preferred example of the same, and that various changes in the shape, size and arrangement of parts may be resorted to, without departing from the spirit of the invention or scope of the subjoined claims.

I claim:

1. A portable emergency electrical power outlet unit for enabling firefighters to power electrical firefighting appliances at the scene of a fire from the exterior of a burning building and without entering the building by utilizing the base of a socket-type meter on the outside of said building, said unit comprising a socket type meter base receptacle, a plug-in having electrical contact prongs adapted to be plugged directly into the socket elements of said socket-type meter base after removal of the meter from the base, plural electrical outlets on said body to receive the plugs of plural electrical appliances and electrically connected with said contact prongs, a grounding cable carried by said body and extending exteriorly thereof and electrically connected with said outlets and having a clip at its free end for temporary attachment to said meter base, and signal light means on said body electrically connected with said outlets to indicate to the user of said unit when said outlets are energized.

2. The invention as defined by claim 1, and wherein said outlets are four in number and arranged in electrically connected pairs and said signal light means comprise a pair of light bulbs one each electrically connected with one of said pairs of outlets.

References Cited by the Examiner

UNITED STATES PATENTS

| | | | |
|---|---|---|---|
| 1,694,158 | 12/28 | Both. | |
| 2,277,216 | 3/42 | Epstein | 200—115.5 XR |
| 2,518,812 | 8/50 | Oswald | 200—115.5 XR |
| 2,563,066 | 8/51 | Procopio | 340—252 |
| 2,606,232 | 8/52 | St. John | 317—108 |
| 3,169,239 | 2/65 | Lacey | 340—252 |

NEIL C. READ, *Primary Examiner.*

ROBERT K. SCHAEFER, *Examiner.*